Oct. 13, 1931.  W. LINDERMANN  1,827,322
DEVICE FOR BREAKAGEPROOF PACKING OF GLASS
AND OTHER VERY FRAGILE ARTICLES
Filed Nov. 25, 1929
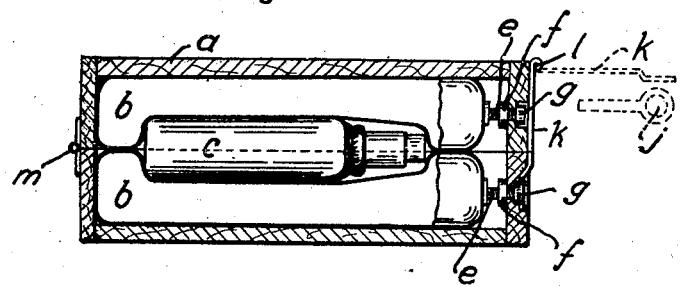
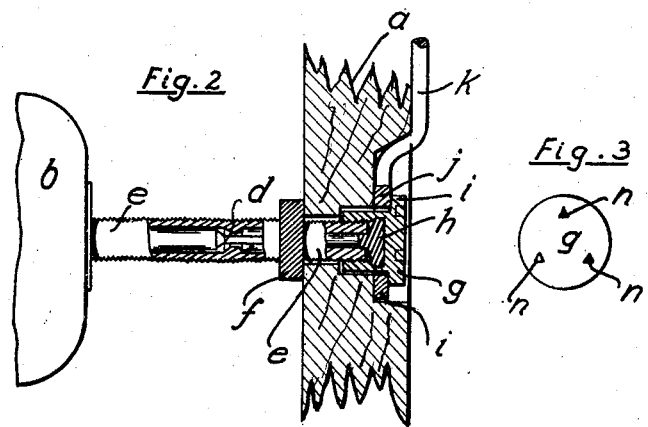 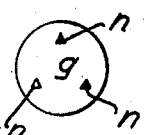
Inventor:

Patented Oct. 13, 1931

1,827,322

UNITED STATES PATENT OFFICE

WILLY LINDERMANN, OF HAMBURG, GERMANY

DEVICE FOR BREAKAGE-PROOF PACKING OF GLASS AND OTHER VERY FRAGILE ARTICLES

Application filed November 25, 1929. Serial No. 409,711.

Products of the ceramic industries especially are wrapped hitherto in straw, excelsior, or similar materials, and then packed into cases. However, it is difficult to distribute the straw cover evenly over the surface of the article to be packed, so as to prevent touching and thereby mutually breaking of very fragile merchandise during transportation. Hence, in shipments of glass, a high percentage of breakage is yet considered unavoidable hitherto.

The present invention relates to a method of packing, whereby the articles to be protected against breakage is enveloped in airfilled rubber bubbles.

This method may also be advantageously applied in cases, where straw and excelsior produce unclean and disturbing effects.

An embodiment of the invention is illustrated by way of example in the accompanying drawings, in which:—

Fig. 1 shows a total exhibition, and a bottle embedded in between two longitudinally sectioned rubber bubbles;

Fig. 2 shows an enlarged section of a device for shutting bottles, combined with means for closing cases;

Fig. 3 shows a top view of a cap screw.

The case wall $a$ envelopes two rubber bubbles $b$ enveloping on their part totally a bottle $c$. Check non-return valves $d$, similar to those used on footballs or pneumatic tyres are also arranged on the said rubber bubbles $b$ allowing them to be pumped up.

Upon the tube $e$, in which the check non-return valve is arranged, a collar $f$ is put up pressing against the case wall $a$.

If the cap screw $g$ is screwed upon the tube $e$, then the collar $f$, as well as the cap screw $g$ press against the case wall $a$. In this way the cap screw $g$, as well as the bubble $b$ connected with the tube $e$ are getting a fixed hold.

A cone $h$ is inserted into the cap screw $g$ which tightens the tube $e$. In case of the check non-return valve proving to be untight, the cone $h$ prevents the bubble $b$ to deflate.

Between the projecting collar $i$ of the cap screw $g$ and the case wall $a$, the eye $j$ of a bent lever $k$ is arranged, which is shown hinging on Fig. 1. The eye $j$ embraces the cap screw $g$, which now serves to tighten the collar $f$, to close up the tube $e$, and to hold the bent lever $k$ in position, thereby closing up the two-parted box $a$.

At $m$, in Fig. 1, the two halves of the case, each of which holding one bubble $b$, are connected together by hinges.

A special plug key with nearly triangularly sectioned plugs may be used for screwing in the cap screw $g$.

If the cap screw $g$ has triangular holes punched in, as shown in Fig. 3, an unauthorized opening of the closed cases will not be easy to realize.

I claim:—

A device for breakage-proof packing of glass and other very fragile articles by means of airfilled rubber bubbles, arranged in a strong case, and between which very fragile merchandise is bedded, characterized by the fact that the shutting device of the rubber bubbles is combined with the shutting device of the case, whereby the eye of a bent lever is pressed by the collar of a cap screw opposite another collar, against the case walls, a cone arranged in the cap screw tightening simultaneously a tube leading to the said bubble.

In testimony whereof I affix my signature.

WILLY LINDERMANN.